(12) United States Patent
Fukuhara

(10) Patent No.: US 10,078,745 B2
(45) Date of Patent: *Sep. 18, 2018

(54) IMAGE DECOLORING APPARATUS AND METHOD OF CONTROLLING SECURITY IN IMAGE DECOLORING APPARATUS

(71) Applicants: KABUSHIKI KAISHA TOSHIBA, Tokyo (JP); TOSHIBA TEC KABUSHIKI KAISHA, Tokyo (JP)

(72) Inventor: Takanori Fukuhara, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/724,944

(22) Filed: Oct. 4, 2017

(65) Prior Publication Data

US 2018/0046793 A1    Feb. 15, 2018

Related U.S. Application Data

(63) Continuation of application No. 14/495,779, filed on Sep. 24, 2014, now Pat. No. 9,811,652.

(30) Foreign Application Priority Data

Oct. 29, 2013   (JP) .................................. 2013-224494

(51) Int. Cl.
*G06F 21/36* (2013.01)
*G06F 21/62* (2013.01)

(52) U.S. Cl.
CPC .......... *G06F 21/36* (2013.01); *G06F 21/6245* (2013.01)

(58) Field of Classification Search
CPC ................. B41M 7/0009; G03G 21/00; H04N 2201/3246; H04N 1/00846; H04N 1/00875; H04N 1/2376; G06F 21/36; G06F 21/6245
See application file for complete search history.

(56) References Cited

U.S. PATENT DOCUMENTS

| 2004/0120522 A1 | 6/2004 | Takeda et al. |
| 2007/0176001 A1 | 8/2007 | Cattrone et al. |
| 2010/0201995 A1 | 8/2010 | Yoshida |
| 2012/0038733 A1 | 2/2012 | Iguchi et al. |
| 2012/0147398 A1 | 6/2012 | Iguchi et al. |
| 2013/0003134 A1 | 1/2013 | Hazu et al. |

*Primary Examiner* — Sonji Johnson
(74) *Attorney, Agent, or Firm* — Patterson & Sheridan, LLP

(57) ABSTRACT

According to an embodiment, an image erasing apparatus includes an accessory information acquiring unit and an execution availability determining unit. The accessory information acquiring unit acquires accessory information related to security of the sheet based on attribute data of a sheet on which an erasable image is formed. The execution availability determining unit each determines execution availability of erase processing for the image on the sheet and execution availability of preservation processing for the image data generated by the readout unit, based on the accessory information.

15 Claims, 7 Drawing Sheets

IMAGE DECOLORING APPARATUS AND METHOD OF CONTROLLING SECURITY IN IMAGE DECOLORING APPARATUS

CROSS-REFERENCE TO RELATED APPLICATIONS

This application is a continuation of U.S. patent application Ser. No. 14/495,779, filed on Sep. 24, 2014, which is based upon and claims the benefit of priority from the prior Japanese Patent Application No. 2013-224494, filed on Oct. 29, 2013, the entire contents of each of which are incorporated herein by reference.

FIELD

Embodiments described herein relate generally to an image erasing apparatus and a method of controlling security in the image erasing apparatus.

BACKGROUND

In recent years, an image erasing apparatus is well known which is configured to decolor an image formed on a sheet using coloring materials to be decolored by heating at a predetermined temperature. The image erasing apparatus takes in a sheet on which an image is formed using the coloring materials and heats it while pressurizing the sheet, thereby decoloring the image. The image erasing apparatus performs erase processing of the image by decoloring the image. The image erasing apparatus is used for facilitating re-use of the sheet. Further, there is a known technique that compares the number of times of erase processing counted by the image erasing apparatus with the limited number of re-uses of the sheets or determines re-availability of the sheet based on detection results of the degree of deterioration of the sheet.

According to the image erasing apparatus of the related art, even when important documents or confidential documents are mixed in the sheets which are a target of the erase processing, the erase processing is uniformly performed on the sheet to be erased upon receipt of a request for erasing input by a user. Further, in preparation for a case where the image formed on the sheet is erroneously erased, the image erasing apparatus scans the sheet to be erased, and can preserve the scanning results in a storage device as an image data file before the erase processing. For example, when the confidential documents or the like are mixed in the sheets to be erased, the image erasing apparatus also preserves contents of the confidential documents or the like. Accordingly, a third party can acquire confidential information by analyzing hardware of the image erasing apparatus. In other words, the image erasing apparatus has problems in terms of information security management.

DETAILED DESCRIPTION

Figure 1:
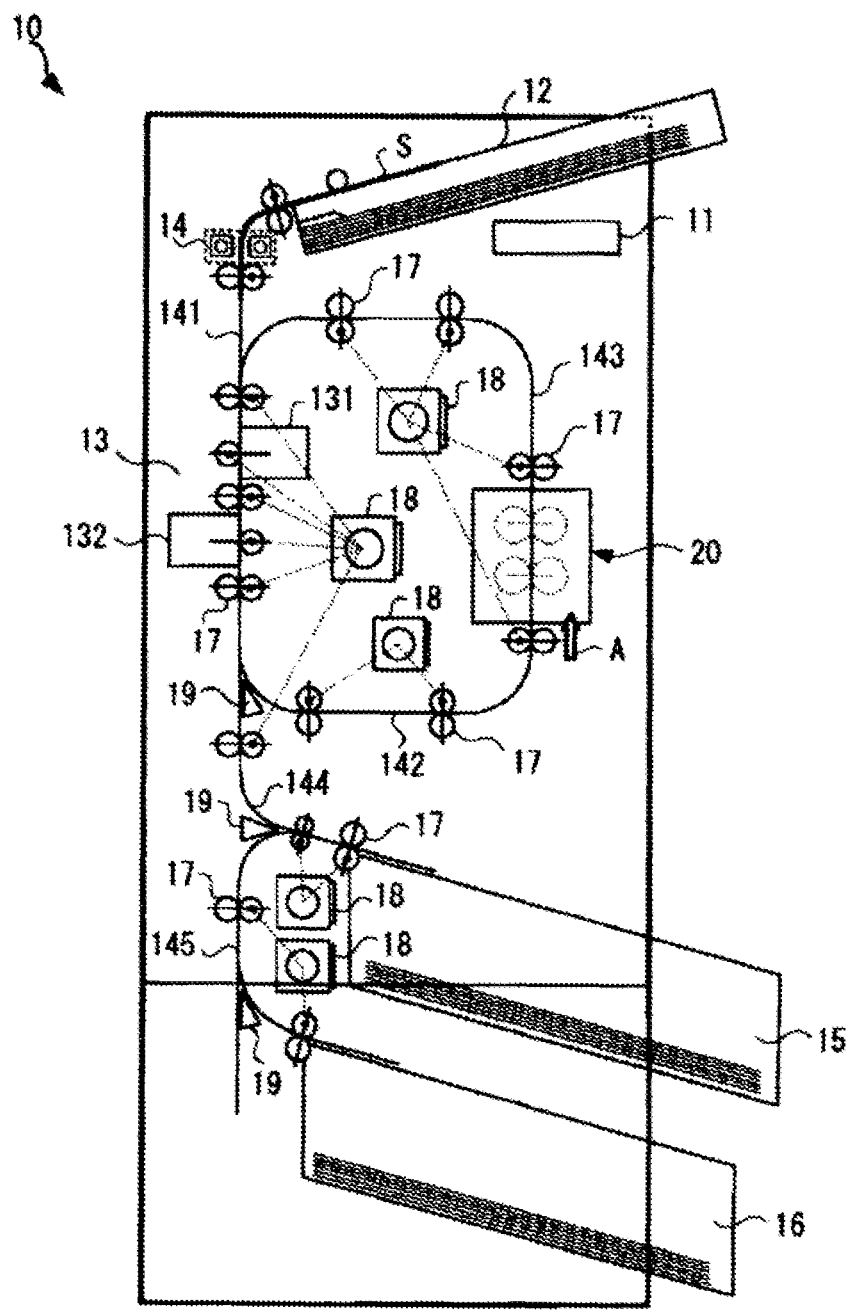
FIG. 1 is a cross-sectional view schematically illustrating an overall configuration of an image erasing apparatus according to a first embodiment.

According to one embodiment, an image erasing apparatus includes a readout unit, a recognition code detecting unit, a decoding unit, an accessory information acquiring unit, an execution availability determining unit, and an execution control unit. The readout unit generates image data, based on results obtained by reading out information of a sheet on which an erasable image is formed. The recognition code detecting unit detects a recognition code of the sheet, based on the image data generated by the readout unit. The decoding unit decodes the recognition code to output attribute data of the sheet which is included in the recognition code. The accessory information acquiring unit acquires accessory information related to security of the sheet, based on the attribute data output by the decoding unit. The execution availability determining unit determines execution availability of erase processing of the image on the sheet and storing processing of the image data generated by the readout unit, based on the accessory information acquired by the accessory information acquiring unit. The execution control unit controls execution of the erase processing and the storing processing of the image data, based on results determined by the execution availability determining unit.

Embodiments will be described below in detail with reference to the drawings. In the drawings, the same reference numeral indicates the same or similar component.

An image erasing apparatus according to a first embodiment will be described with reference to FIG. 1. FIG. 1 is a cross-sectional view schematically illustrating an overall configuration of an image erasing apparatus 10 according to the first embodiment. As illustrated in FIG. 1, the image erasing apparatus 10 includes a control panel 11, a sheet feeding unit 12, a readout unit 13, an ultrasonic unit 14, and an erase unit 20. The control panel 11 receives an erase request or the like input by a user as will be described below. The sheet feeding unit 12 is provided at a top of the image erasing apparatus 10. The sheet feeding unit 12 holds a sheet S, which is a target of erase processing, set by the user and supplies the sheet S to a conveyance path to be described below. An erasable image is formed on the sheet S. Specifically, the image is formed on the sheet S using coloring materials which are decolored by heating, for example. The image formed on the sheet S includes a document image and a recognition code image to be described below. The sheet S having a high security level and the sheet S having a low security level are mixedly set in the sheet feeding unit 12 by the user. The high security level sheet S is a sheet on which a high security level image (for example, a document image of a high-confidentiality) is formed. In other words, the high security level sheet S includes a sheet having a trouble in erasing the document image formed on the sheet S. The high security level sheet S includes a sheet having a trouble in storing the document image formed on the sheet S, without any changing. In contrast, the low security level sheet S is a sheet on which a low security level image (for example, a document image of a low-confidentiality) is formed. In other words, the low security level sheet S includes a sheet not having a trouble in storing the document image formed on the sheet S, without any changing and a trouble in erasing the document image formed on the sheet S. The readout unit 13 reads out information of the sheet S prior to erase processing, as will be described below. The information of the sheet S includes the image formed on the sheet S. Further, the information of the sheet S includes a print status of the sheet S. The readout unit 13 generates image data based on readout results. Specifically, the readout unit 13 is, for example, a line scanner. In the following description, the readout unit 13 is referred to as a scanner 13. The scanner 13 optically scans the sheet S to read out the information of the sheet S. The scanner 13 generates image data based on scanning results. In the following description, the image data is referred to as scan image data. The scan image data includes image data of the document and image data of the recognition code. Further, the scan image data includes data relating to the print status of the sheet S. The ultrasonic unit 14 detects a conveyance state of the sheet S in a conveyance path 141 to be described below. The erase unit 20 is a heat source unit configured to heat the sheet S in order to decolor the image formed on the sheet S. The erase unit 20 decolors the image formed on the sheet S to perform the erase processing on the image. In addition, the image erasing apparatus 10 includes a first conveyance path 141, a second conveyance path 142, a third conveyance path 143, a fourth conveyance path 144, a fifth conveyance path 145, and a sheet discharging unit having a first sheet discharging tray 15 and a second sheet discharging tray (reject box) 16.

As illustrated in FIG. 1, each of the conveyance paths 141 to 145 has a plurality of conveyance rollers 17 in order to convey the sheet S. The image erasing apparatus 10 has a plurality of motors 18 configured to drive the conveyance rollers 17 of each of the conveyance paths 141 to 145. Each of the conveyance paths 141 to 145 has a plurality of gates 19. The plurality of gates 19 are provided at a first to third branch position to be described below. The gate 19 guides the sheet S to each of the conveyance paths such that the sheet S is exactly conveyed to the second conveyance path 142 from the first conveyance path 141 or the sheet S is exactly conveyed to the fourth conveyance path 144 from the first conveyance path 141. Further, the gate 19 guides the sheet S such that the sheet S is exactly conveyed to the first sheet discharging tray 15 from the fourth conveyance path 144 or the sheet S is exactly conveyed to the fifth conveyance path 145 from the fourth conveyance path 144. Further, the gate 19 guides the sheet S such that the sheet S is exactly conveyed to the second sheet discharging tray 16 from the fifth conveyance path 145. The image erasing apparatus 10 has a driving unit such as a solenoid (not illustrated) so as to drive the plurality of gates 19.

The first conveyance path 141 is disposed via the scanner 13 from the sheet feeding unit 12. The first conveyance path 141 is configured to convey the sheet S fed by the sheet feeding unit 12 to the scanner 13. The second conveyance path 142 is disposed to reach an entrance part of the erase unit 20 by branching from the first conveyance path 141 at a first branch position on a downstream side of the scanner 13. The second conveyance path 142 is configured to convey the sheet S passed through the scanner 13 to the erase unit 20 (direction of arrow A in FIG. 1). The third conveyance path 143 is disposed so as to join at a position on an upstream side of the scanner 13 from an exit part of the erase unit 20 in a conveyance direction of the sheet S through the first conveyance path 141. The third conveyance path 143 is configured to re-convey the sheet S passed through the erase unit 20 to the scanner 13. The fourth conveyance path 144 is disposed to reach a second branch position on an upstream side of an entrance part of the first sheet discharging tray 15 from the first branch position. The fourth conveyance path 144 is configured to convey the sheet S guided by the gate 19 of the first branch position to the first sheet discharging tray 15 in cooperation with the gate 19 at the second branch position. The fifth conveyance path 145 is provided to reach a third branch position on an upstream side of an entrance part of the second sheet discharging tray 16 by branching from the fourth conveyance path 144 at the second branch position. The fifth conveyance path 145 is configured to convey the sheet S guided by the gate 19 of the second branch position to the second sheet discharging tray 16 in cooperation with the gate 19 at the third branch position.

The first sheet discharging tray 15 accommodates the sheet S so as to collect a reusable sheet S, for example, after the image is subjected to the erase processing. The second sheet discharging tray 16 is a reject box. The second sheet discharging tray 16 accommodates the sheet S so as to collect the sheet S which is difficult to reuse and is wasted and recycled.

The image erasing apparatus 10 performs operations (1) to (5) below.

(1) The image erasing apparatus 10 scans a surface of the sheet S prior to the erase processing to obtain the image data. Specifically, the sheet S fed by the sheet feeding unit 12 is conveyed to the scanner 13 through the first conveyance path 141. The scanner 13 scans the surface of the sheet S passing therethrough to generate the scan image data. The scanner 13 has a first scanner 131 and a second scanner 132. The first scanner 131 is provided along the first conveyance path 141 so as to face one surface of the sheet S to be conveyed through the first conveyance path 141. The second scanner 132 is provided along the first conveyance path 141 so as to face the other surface of the sheet S to be conveyed through the first conveyance path 141. The first scanner 131 and the second scanner 132 are disposed opposite to each other along the first conveyance path 141. For example, the scanner 13 generates scan image data both surfaces of the sheet S using the first scanner 131 and the second scanner 132 prior to the erase processing. The image erasing apparatus 10 grasps the print status of both surfaces of the sheet S from the scanner image data.

(2) The image erasing apparatus 10 performs preservation or the like of the scan image data prior to the erase processing. Further, the image erasing apparatus 10 determines from the print status grasped by the scanner image data whether tears or wrinkles occur on the sheet S. When the tears or wrinkles have occurred on the sheet S, the sheet S is conveyed to the second sheet discharging tray 16, which is the reject box, through the fifth conveyance path 145. When the tears or wrinkles have not occurred on the sheet S, the sheet S is conveyed to the erase unit 20 through the second conveyance path 142.

(3) The image erasing apparatus 10 performs the erase processing on the image formed on the sheet S using the erase unit 20. Specifically, when the sheet S to be conveyed through the second conveyance path 142 passes through the erase unit 20, the erase unit 20 heats and pressurizes the sheet S at a relatively high temperature of, for example, 180 to 200° C. and decolors the image on the sheet S. The erase unit 20 decolors the image, thereby erasing the image formed on the sheet S.

(4) The image erasing apparatus 10 scans again the sheet S so as to confirm whether the image is surely erased after the erase processing is performed by the erase unit 20. Specifically, the sheet S after erase processing is re-conveyed to the scanner 13 through the third conveyance path 143. The scanner 13 scans both surfaces of the sheet S which is subjected to the erase processing using the first scanner 131 and the second scanner 132 and generates the scan image data. The image erasing apparatus 10 grasps the print status of both surfaces of the sheet S, based on the scan image data generated by the first scanner 131 and the second scanner 132. The image erasing apparatus 10 confirms from the print status of both surfaces of the sheet S whether the image formed in an image region on the sheet S by decolorable coloring materials is surely decolored. The image erasing apparatus 10 confirms whether the image is decolored and thus confirms whether the image on the sheet S is erased.

(5) The image erasing apparatus 10 conveys the sheet S to the first sheet discharging tray 15 when the sheet S subjected to the erase processing is reusable and conveys the sheet S to the second sheet discharging tray 16 as the reject box when the sheet S subjected to the erase processing is difficult to be reusable. Specifically, the image erasing apparatus 10 determines whether the image formed in the image region on the sheet S with the decolorable coloring materials is surely decolored, based on the print status grasped from the scan image data obtained after the erase processing. Further, the image erasing apparatus 10 determines whether the image formed in the image region on the sheet S with non-decolorable coloring materials or a handwritten image of the user remains, based on the print status. Further, the image erasing apparatus 10 determines whether the tears or wrinkles have occurred on the sheet S, based on the print status. From the determination results, when the image formed in the image region on the sheet S with the decolorable coloring materials is surely decolored and when the image formed in the image region on the sheet S with the non-decolorable coloring materials or the handwritten image of the user has not remained and the tears or wrinkles have not occurred on the sheet S, the image erasing apparatus 10 recognizes that the sheet S is a reusable sheet. The reusable sheet S is conveyed to the first sheet discharging tray 15 through the fourth conveyance path 144. On the other hand, from the determination results, when the image formed in the image region on the sheet S with the decolorable coloring materials is surely not decolored and when the image formed in the image region on the sheet S with the non-decolorable coloring materials or the handwritten image of the user remains or the tears or wrinkles have occurred on the sheet S, the image erasing apparatus 10 recognizes that the sheet S is a non-reusable sheet. The non-reusable sheet S is conveyed to the second sheet discharging tray 16, which is the reject box, through the fifth conveyance path 145.

Figure 2:
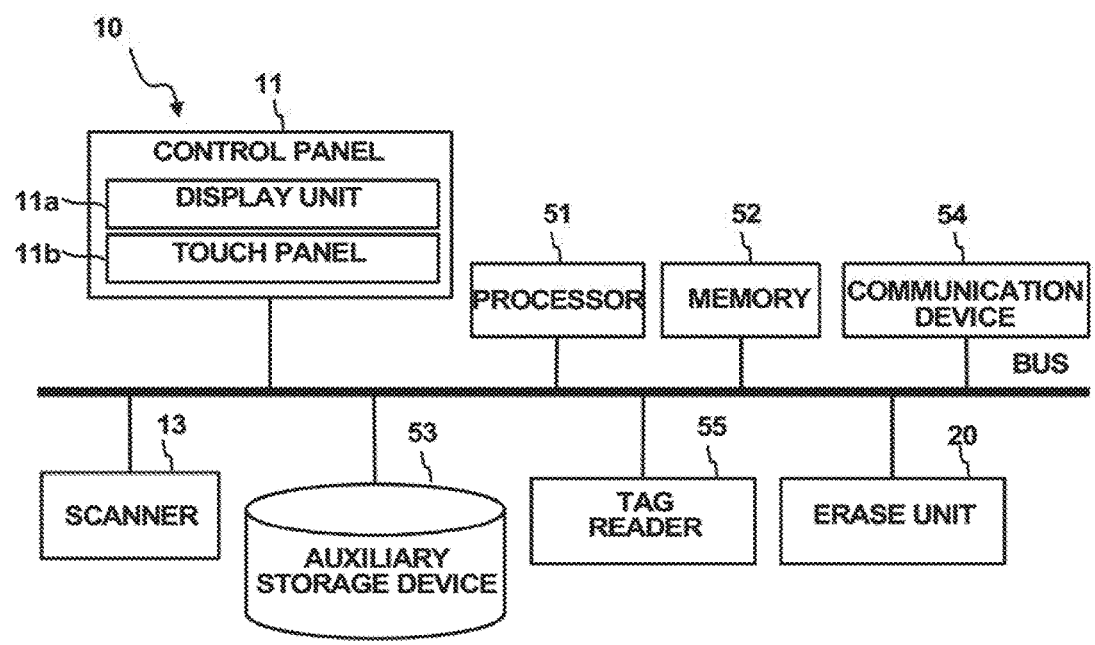
FIG. 2 is a diagram illustrating a hardware configuration of the image erasing apparatus according to the first embodiment.

A hardware configuration of the image erasing apparatus 10 will be described below with reference to FIG. 2. FIG. 2 is a diagram illustrating the hardware configuration of the image erasing apparatus 10. As illustrated in FIG. 2, the image erasing apparatus 10 includes a processor 51, a memory 52, an auxiliary storage device 53, a communication device 54, a tag reader 55, and a control panel 56 in addition to the erase unit 20 and the scanner 13. The processor 51 is a central processing unit (CPU) for comprehensively controlling an operation of the image erasing apparatus 10. The number of CPUs included in the image erasing apparatus 10 is not limited to a singular number. The image erasing apparatus 10 has a plurality of CPUs as the processor 51 and may execute a plurality of programs in parallel by the plurality of CPUs. The memory 52 includes a readout-only ROM for storing basic programs, environmental files or the like which are used to function a computer. The memory 52 includes a random access memory (RAM) for storing programs to be executed by the processor 51 and data required for the execution of each program. The auxiliary storage device 53 is a storage device such as a hard disk drive (HDD). The auxiliary storage device 53 stores data regarding a use status of the image erasing apparatus 10. The auxiliary storage device 53 stores the scan image data, which is generated by the scanner 13, as a backup of the image formed on the sheet S before the erase processing. The auxiliary storage device 53 further stores programs or the like for operating on a control system of the image erasing apparatus 10. The communication device 54 exchanges information with an image forming apparatus, for example, a host computer such as multi-function peripherals (MFP) 30 (see FIG. 3) which is connected through a network. The tag reader 55 is a device for reading out user information, which is recorded in an IC tag carried by a user, using radio communication. The image erasing apparatus 10 can use the user information read out by the tag reader 55, thereby performing use control such as the erase processing in a user unit. The control panel 11 is an output device having a display unit 11a and a touch panel 11b. The display unit 11a is a display for displaying a function menu provided by the image erasing apparatus 10. The touch panel 11b receives an erase request or the like input by a user. As described above, the scanner 13 optically scans the sheet S, thereby generating the scan image data.

Figure 3:
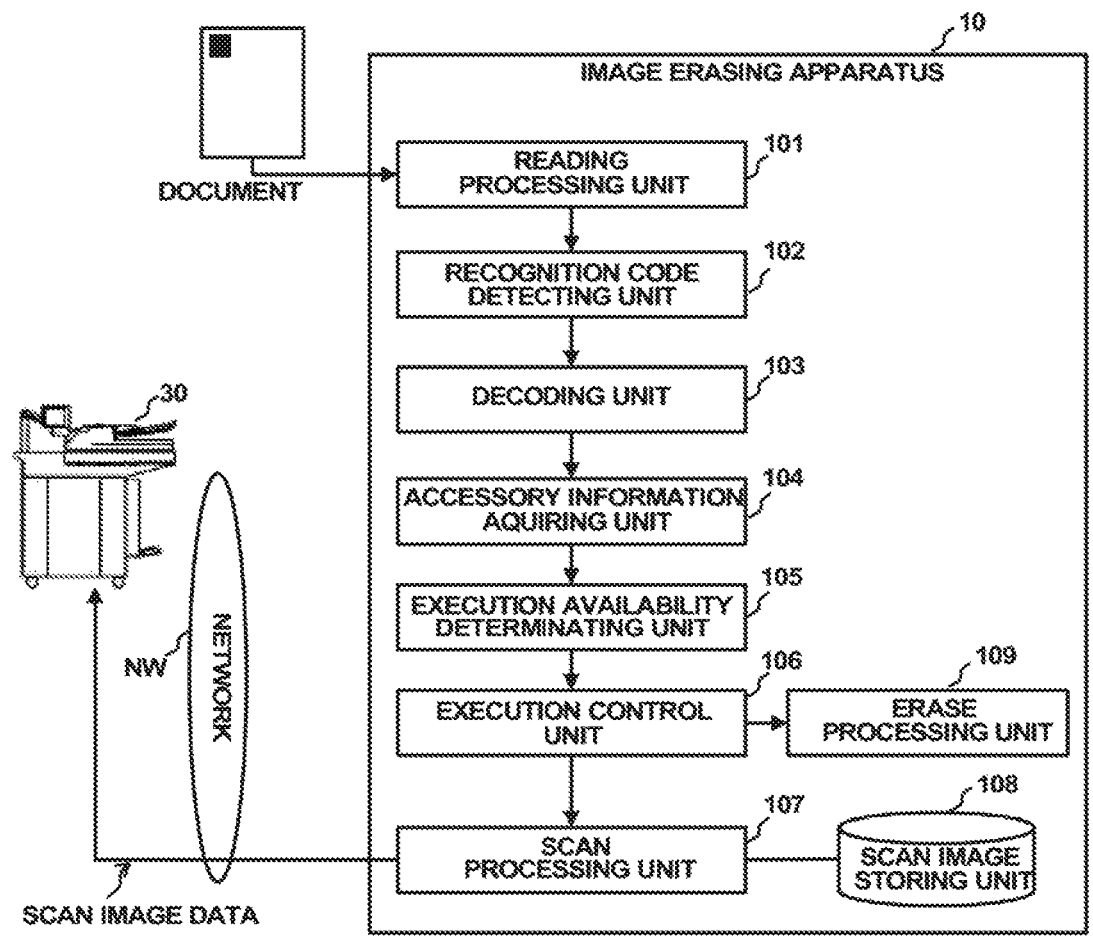
FIG. 3 is a block diagram illustrating a control configuration of the image erasing apparatus according to the first embodiment.

A control function of the processor 51 of the image erasing apparatus 10 will be described below with reference to FIG. 3. FIG. 3 is a block diagram illustrating the control function of the image erasing apparatus 10. The image erasing apparatus 10 includes a readout processing unit 101, a recognition code detecting unit 102, a decoding unit 103, an accessory information acquiring unit 104, an execution availability determining unit 105, an execution control unit 106, a scan processing unit 107, a scan image storing unit 108, and an erase processing unit 109. The processor 51 reads out programs stored in the ROM or the auxiliary storage device 53 in the RAM and executes the programs, thereby operating functions of each unit.

The readout processing unit 101 controls a scanning operation of the scanner 13. As described above, the scanner 13 optically scans the sheet S (document) on which the image is formed using the coloring materials capable of being decolored by the heating. The scanner 13 generates the scan image data based on the scanning results of the sheet S. The recognition code detecting unit 102 has a storage area (not illustrated) for storing standard information of the recognition code in advance. The recognition code detecting unit 102 compares the standard information of the recognition code which is stored in advance with the scan image data to detect the recognition code included on the surface of the sheet S. The recognition code detecting unit 102 has a function to search a position of the recognition code on the surface of the sheet S. Accordingly, a disposed position of the recognition code in the surface of the sheet S may be optional.

Figure 4A:
FIG. 4A is a diagram illustrating a recognition code included in a sheet which is a target of the erase processing of the image erasing apparatus according to the first embodiment.
Figure 4B:
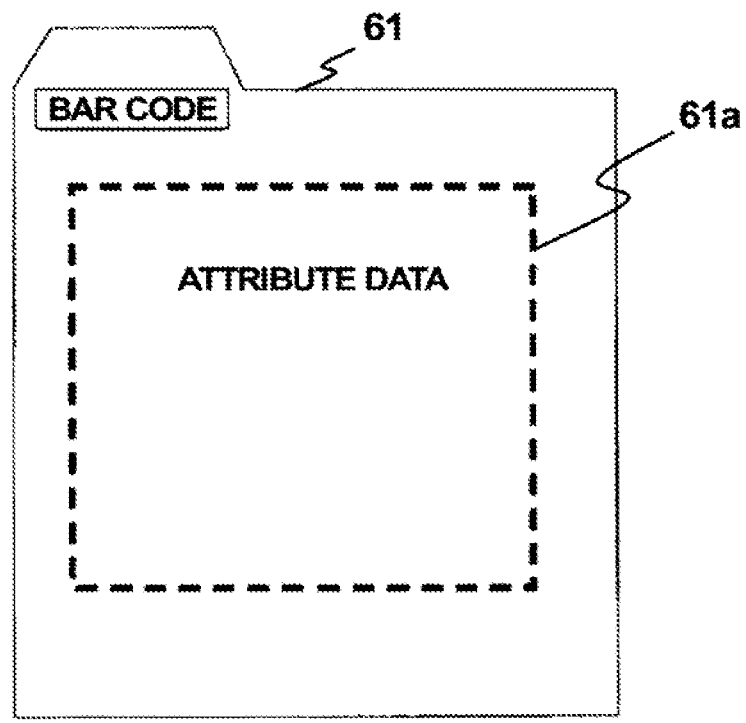
FIG. 4B is a diagram for describing attribute data of the recognition code included in the sheet which is a target of the erase processing of the image erasing apparatus according to the first embodiment.

The decoding unit 103 decodes the recognition code detected by the recognition code detecting unit 102, thereby outputting the attribute data of the sheet S. The recognition code and the attribute data held in the recognition code will be described below with reference to FIGS. 4A and 4B. FIG. 4A is a diagram illustrating the recognition code included in the sheet S which is a target of the erase processing of the image erasing apparatus 10. As illustrated in FIG. 4A, for example, the recognition code is formed on the sheet S as an image. For example, the recognition code is a two-dimensional bar code 61 as illustrated in FIG. 4A. The two-dimensional bar code 61 can hold data of several kilobytes. A disposed position of the two-dimensional bar code 61 on the surface of the sheet can be easily detected by the scanner 13. FIG. 4B is a diagram for describing the attribute data held in the recognition code. As illustrated in FIG. 4B, the two-dimensional bar code 61 holds attribute data 61a. Specifically, the two-dimensional bar code 61 holds data regarding execution availability of an erase processing function in the image erasing apparatus 10, as the attribute data 61a. The two-dimensional bar code 61 holds data regarding execution necessity of an encryption processing function for the scan image data in the image erasing apparatus 10. The two-dimensional bar code 61 holds data regarding execution availability of a preservation processing function for the scan image data in the image erasing apparatus 10. The execution availability of the function represents the presence or absence of execution restriction of the function. The execution necessity of the function represents whether the execution of the function is necessary. Further, the two-dimensional bar code 61 holds data regarding availability of functions provided by the MFP 30 connected through a network NW, as the attribute data 61a. For example, the availability of the function represents the presence or absence of authority for use. The function provided by the MFP 30 includes, for example, an encryption function, a scanning function, and a filing BOX function. The filing BOX function is a function to preserve image data or the like in a folder which is the storage area of the MFP 30. Further, the two-dimensional bar code 61 holds various kinds of data such as administrator setting and network setting, as the attribute data 61a. The image erasing apparatus 10 may acquire data regarding availability of the erase processing or the like from the recognition code 61 included in the sheet S. Accordingly, the recognition code 61 may be a one-dimensional bar code, a predetermined symbol, or a predetermined image. Further, when an image of the document is formed on the sheet S by the MFP, the recognition code 61 is formed on the sheet S together with the image of the document. Specifically, with respect to the document image formed on the sheet S, it can determine whether or not to form the recognition code 61 on the sheet S and contents of the attribute data 61a included in the recognition code 61, depending on an instruction of the user to the MFP based on the determination results of the security level (for example, confidentiality or the like) by the user. For example, when the user is determined that the document image formed on the sheet S has the high security level, the user instructs the MFP to form the recognition code 61 on the sheet S. Further, in order to prohibit the image formed on the sheet S from being erased, the user instructs the MFP to include data indicating that the erase processing function is not executable (execution restriction is present) in the recognition code 61, as the attribute data 61a. Alternatively, in order to prohibit the data of the image formed on the sheet S from being preserved by the image erasing apparatus 10, the user instructs the MFP to include data indicating that the preservation processing function for the scan image data is not executable (execution restriction is present) in the recognition code 61, as the attribute data 61a. Further, in order to preserve the data by encrypting the image data formed on the sheet S, the user instructs the MFP to include data indicating that the preservation processing function for the scan image data is executable (execution restriction is absent) and data indicating that the execution of the encryption processing function is necessary in the recognition code 61, as the attribute data 61a. Meanwhile, when the user determines that the document image formed on the sheet S has the low security level, the user instructs the MFP not to form the recognition code 61 in the sheet S. Alternatively, in order to permit the image formed on the sheet S to be erased, the user instructs the MFP to include data indicating that the erase processing function is executable (execution restriction is absent) in the recognition code 61, as the attribute data 61a. Further, in order to permit the data of the image formed on the sheet S to be preserved by the image erasing apparatus 10, the user instructs the MFP to include data indicating that the preservation processing function for the scan image data is executable (execution restriction is absent) in the recognition code 61, as the attribute data 61a. The MFP receives the instructions of the user to form the document image and the image of the recognition code 61 which holds the attribute data 61a on the sheet S.

The accessory information acquiring unit 104 acquires accessory information related to the security of the sheet S from the attribute data 61a output by the decoding unit 103. The accessory information related to the security includes data regarding the execution availability of the erase processing function described above. The accessory information related to the security includes data regarding execution availability (execution necessity) of the encryption processing function. Further, the accessory information related to the security includes data regarding execution availability of the preservation processing function for the scan image data.

In order words, the accessory information acquiring unit 104 acquires the data regarding the execution availability of the erase processing function, the data regarding the execution necessity of the encryption processing function, and the data regarding the execution availability of the preservation processing function for the scan image data from the attribute data 61a, as the accessory information related to the security. Further, the accessory information acquiring unit 104 acquires accessory information for using the functions provided by the MFP 30 from the attribute data 61a output by the decoding unit 103. The accessory information for using the functions provided by the MFP 30 includes, for example, the data regarding the availability of the encryption function, the data regarding the availability of the scanning function, and the data regarding the availability of the filing BOX function described above. In order words, further, the accessory information acquiring unit 104 acquires the data regarding the availability of the encryption function, the data regarding the availability of the scanning function, and the data regarding the availability of the filing BOX function from the attribute data 61a, as the accessory information for using the functions provided by the MFP 30.

The execution availability determining unit 105 each determines, with respect to the sheet, the execution availability of the erase processing function, the execution necessity of the encryption processing function, and the execution availability of the preservation processing function for the scan image data, based on the accessory information related to the security which is acquired by the accessory information acquiring unit 104. Specifically, the execution availability determining unit 105 determines that the erase processing function is executable on the basis that the accessory information includes data indicating that the erase processing function is executable. The execution availability determining unit 105 determines that the erase processing function is not executable on the basis that the accessory information includes data indicating that the erase processing function is not executable. The execution availability determining unit 105 determines that the execution of the encryption processing function is necessary on the basis that the accessory information includes data indicating that the execution of the encryption processing function is necessary. The execution availability determining unit 105 determines that the execution of the encryption processing function is unnecessary on the basis that the accessory information includes data indicating that the execution of the encryption processing function is unnecessary. The execution availability determining unit 105 determines that the preservation processing function is executable on the basis that the accessory information includes data indicating that the preservation processing function is executable. The execution availability determining unit 105 determines that the preservation processing function is not executable on the basis that the accessory information includes data indicating that the preservation processing function is not executable. The execution availability determining unit 105 outputs determination results regarding the execution availability or execution necessity of the function of the image erasing apparatus to the execution control unit 106. Further, the execution availability determining unit 105 determines availability of the function of the MFP 30, for example, availability of the filing BOX function, based on the accessory information related to the use of the functions of the MFP 30 which is acquired by the accessory information acquiring unit 104. The execution availability determining unit 105 output determination results regarding the availability of the function of the MFP 30 to the execution control unit 106.

The execution control unit 106 each controls the execution of the erase processing function, the encryption processing function, the preservation processing function for the scan image data and the like, based on the determination results regarding the execution availability (presence or absence of execution restriction) of the functions of the image erasing apparatus 10 from the execution availability determining unit 105. Specifically, when the determination result regarding the execution availability of the erase processing function is indicated to be executable, the execution control unit 106 determines that the execution restriction of the erase processing function is absent and permits the execution of the erase processing function. For example, the execution control unit 106 outputs information on erase-permission control for permitting the execution of the erase processing function to the erase processing unit 109. When the determination result regarding the execution availability of the erase processing function is indicated to be non-executable, the execution control unit 106 determines that the execution restriction of the erase processing function is present and prohibits the execution of the erase processing function. For example, the execution control unit 106 outputs information on erase-prohibition control for prohibiting the execution of the erase processing function to the erase processing unit 109. Further, when the determination result regarding the execution necessity of the encryption processing function for the scan image data is indicated to be necessary to execute, the execution control unit 106 determines that the execution of the encryption processing function is necessary and permits the execution of the encryption processing function for the scan image data. For example, the execution control unit 106 outputs information on encryption permission control for permitting the execution of the encryption processing function for the scan image data to the scan processing unit 107. When the determination result regarding the execution necessity of the encryption processing function for the scan image data is indicated to be unnecessary to execute, the execution control unit 106 determines that the execution of the encryption processing function is unnecessary and prohibits the execution of the encryption processing function for the scan image data. For example, the execution control unit 106 outputs information on information on encryption prohibition control for prohibiting the execution of the encryption processing function for the scan image data to the scan processing unit 107. Further, when the determination result regarding the execution availability of the preservation processing function for the scan image data is indicated to be executable, the execution control unit 106 determines that the execution restriction of the preservation processing function is absent and permits the execution of the preservation processing function for the scan image data. For example, the execution control unit 106 outputs information on preservation permission control for permitting the execution of the preservation processing function for the scan image data to the scan processing unit 107. When the determination result regarding execution availability of the preservation processing function for the scan image data is indicated to be non-executable, the execution control unit 106 determines that the execution restriction of the preservation processing function is present and prohibits the execution of the preservation processing function for the scan image data. For example, the execution control unit 106 outputs information on preservation prohibition control for prohibiting the execution of the preservation processing function for the scan image data to the scan processing unit 107. As will be described below, for example, the image erasing apparatus 10 can execute the preservation processing of the scan image data for the folder of the MFP 30 using the filing BOX function of the MFP 30. In this case, the execution control unit 106 controls the use of the filing BOX function based on the determination results regarding the availability of the functions of the MFP 30 from the execution availability determining unit 105. For example, when the determination result regarding the availability of the filing BOX function is indicated to be available, the execution control unit 106 determines that the authority to use the filing BOX function is absent and automatically permits processing of preserving the scan image data in the folder of the MFP 30. For example, the execution control unit 106 outputs information on BOX utilization permission control for permitting the use of the filing BOX function of the MFP 30 to the scan processing unit. For example, when the determination result regarding the availability of the filing BOX function is indicated to be non-available, the execution control unit 106 determines that the authority to use the filing BOX function is present and automatically prohibits the processing of preserving the scan image data in the folder of the MFP 30. For example, the execution control unit 106 outputs information on BOX utilization prohibition control for prohibiting the use of the filing BOX function of the MFP 30 to the scan processing unit 107. In other words, the execution control unit 106 of the image erasing apparatus 10 recognizes the recognition code (two-dimensional bar code 61*a*) itself as an execution command and can restrict the use of functions provided in the MFP 30 connected through the network as well as the functions of the image erasing apparatus 10.

When the execution of the preservation processing function for the scan image data is permitted by the execution control unit 106, the scan processing unit 107 sends the scan image data to the scan image storing unit 108 or the MFP 30 so as to preserve the scan image data in the scan image storing unit 108 or the folder of the MFP 30. For example, when the use of the filing BOX function of the MFP 30 is permitted by the execution control unit 106, the scan processing unit 107 sends the scan image data to the MFP 30, based on the information on the filing BOX utilization permission control output from the execution control unit 106 so as to preserve the scan image data in the folder of the MFP 30. For example, when the use of the filing BOX function of the MFP 30 is prohibited by the execution control unit 106, the scan processing unit 107 sends the scan image data to the scan image storing unit 108, based on the information on the filing BOX utilization prohibition control output from the execution control unit 106 so as to preserve the scan image data in the scan image storing unit 108. Further, the scan processing unit 107 has the encryption processing function. The encryption processing function is a function to encrypt the scan image data. When the scan processing unit 107 executes the encryption processing function, the scan image data before the encryption processing is erased so as not to be restored at a predetermined timing. Specifically, the scan processing unit 107 temporarily preserves the scan image data before the encryption processing in a buffer of the image erasing apparatus 10. For example, the scan processing unit 107 reads out the scan image data from the buffer based on the information on the preservation permission control and the information on the encryption permission control from the execution control unit when the document image formed on the sheet S has the high security level. The scan processing unit 107 encrypts the readout scan image data. The scan processing unit 107 preserves again the encrypted scan image data in the buffer. The scan processing unit 107 preserves the encrypted scan image data in the buffer to update the scan image data preserved in the buffer. The scan processing unit 107 updates the scan image data preserved in the buffer to erase the scan image data before the encryption. In order words, for example, the scan processing unit 107 executes the encryption processing function and preserves the scan image data when the image formed on the sheet S has the high security level. On the other hand, when the execution of the preservation processing function for the scan image data is prohibited by the execution control unit 106, the scan processing unit 107 eventually erases the scan image data without preserving it, based on the information on the preservation prohibition control output from the execution control unit 106. The preservation processing function for the scan image data is prohibited, for example, when the image formed on the sheet S has the high security level. In other words, when the image formed on the sheet S has the high security level, the execution availability determining unit 105 determines that the preservation processing function for the scan image data is not executable. Based on the determination results, the execution control unit 106 outputs the information on the preservation prohibition control for prohibiting the execution of the preservation processing function for the scan image data to the scan processing unit 107. Therefore, when the image formed on the sheet S has the high security level, the scan processing unit 107 eventually erases the scan image data without preserving it, based on the information on the preservation prohibition control output from the execution control unit 106. The scan image storing unit 108 is a storage device for storing the scan image data sent from the scan processing unit 107. The erase processing unit 109 controls an operation of the erase unit 20. When the execution of the erase processing function is permitted by the execution control unit 106, the erase processing unit 109 controls the operation of the erase unit 20 based on the information on the erase permission control output from the execution control unit 106 such that the image on the sheet S is erased by the erase unit 20. On the other hand, when execution of a decolor processing function is prohibited by the execution control unit 106, the erase processing unit 109 controls the operation of the erase unit 20 based on the information on the erase-prohibition control output from the execution control unit 106 so as to prohibit the image formed on the sheet S from being erased. In other words, the erase unit 20 performs the operation of erasing the image on the sheet S when the execution of the erase processing function is permitted by the execution control unit 106 and stops the operation of erasing the image on the sheet S when the execution of the erase processing function is prohibited by the execution control unit 106.

Figure 5:
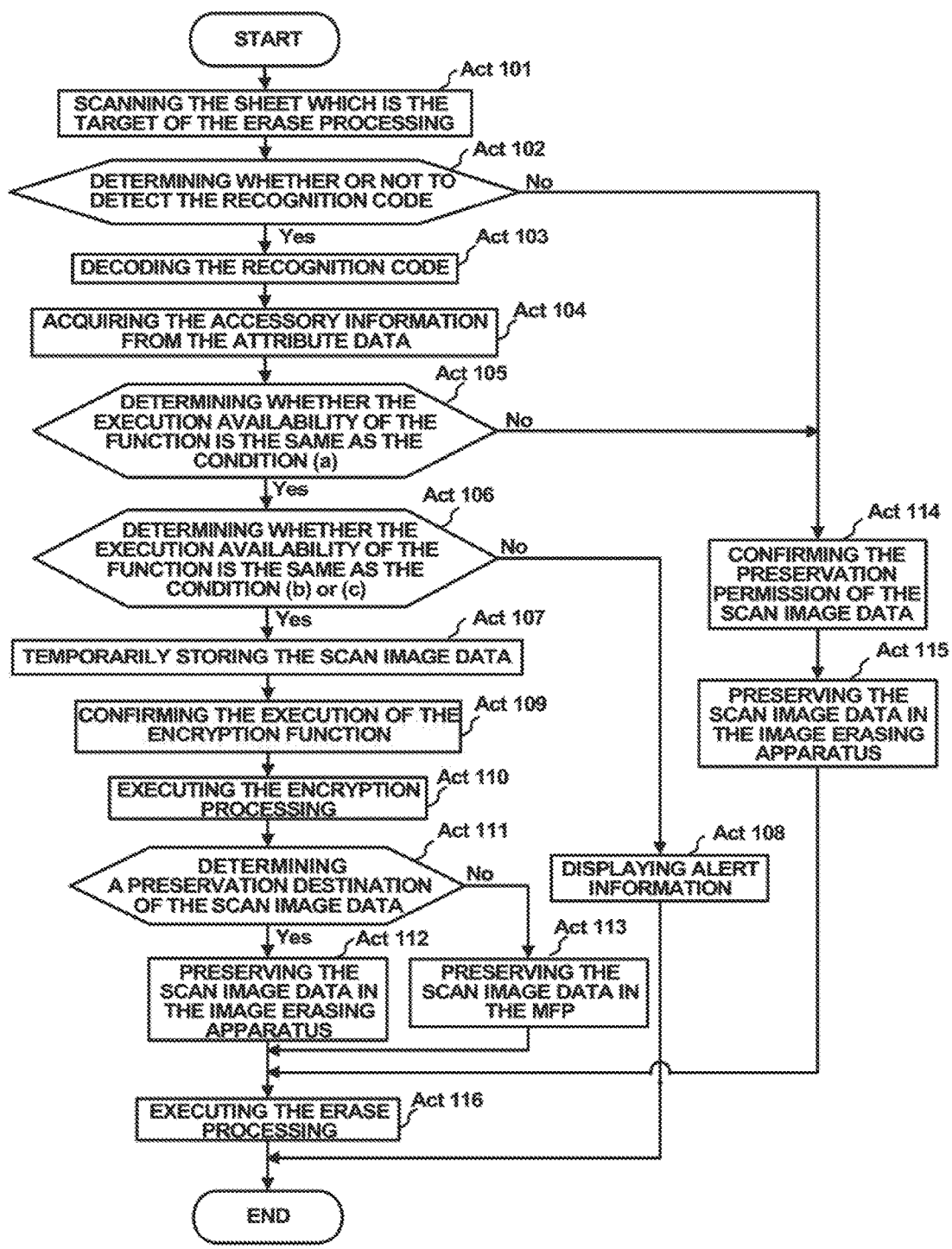
FIG. 5 is a flowchart illustrating control processing of the image erasing apparatus according to the first embodiment.

Security control processing of the image erasing apparatus 10 will be described below with reference to FIG. 5. FIG. 5 is a flowchart illustrating the control processing of the image erasing apparatus 10. It is assumed that the sheet S having a high security level and the sheet S having a low security level are mixedly set in the sheet feeding unit 12 of the image erasing apparatus 10 by the user. The high security level sheet S is a sheet on which the high security level image (for example, the image of the high-confidentiality) is formed as described above. In other words, the high security level sheet S includes a sheet having a trouble in erasing the image formed on the sheet S. The high security level sheet S includes a sheet with problem in preserving the image formed on the sheet S, without any changing. In contrast, the low security level sheet S is a sheet on which the low security level image (for example, the image of the low-confidentiality) is formed as described above. In other words, the low security level sheet S includes a sheet with no problem in preserving the image formed on the sheet S, without any changing or in erasing the image formed on the sheet S.

The image erasing apparatus 10 supplies the sheet S, which is the target of the erase processing, to the first conveyance path 141 from the sheet feeding unit 12 when the control panel 11 receives a request of the erase processing input by the user. The image erasing apparatus 10 starts to operate by sending the sheet S to the first conveyance path 141. The image erasing apparatus 10 performs the erase processing according to the following security control processing.

When the image erasing apparatus 10 starts to operate, the sheet S is conveyed to the scanner 13 through the first conveyance path 141. As illustrated in FIG. 5, in Act 101, the readout processing unit 101 controls the scanning operation using the scanner 13. The scanner 13 scans the sheet S which is the target of the erase processing and generates the scan image data based on scanning results.

In Act 102, the recognition code detecting unit 102 determines whether or not to detect the recognition code by searching the surface of the sheet S which is the target of the erase processing. Specifically, as described above, the recognition code detecting unit 102 compares the previously stored standard information of the recognition code with the scan image data generated by the scanner 13. The recognition code detecting unit 102 detects the recognition code included in the sheet S from comparison results. When detecting the recognition code (Yes in Act 102), the recognition code detecting unit 102 outputs the detected recognition code to the decoding unit 103. If the recognition code detecting unit 102 outputs the recognition code to the decoding unit 103, the process of the image erasing apparatus 10 proceeds to Act 103. The image erasing apparatus 10 considers the sheet S as a sheet having the high security level and performs processes subsequent to Act 103. In contrast, when the recognition code detecting unit 102 does not detect the recognition code (No in Act 102), the process of the image erasing apparatus 10 proceeds to Act 114. The image erasing apparatus 10 considers the sheet S as a sheet having the low security level and performs processes subsequent to Act 114.

In Act 103, the decoding unit 103 decodes the recognition code detected by the recognition code detecting unit 102. The decoding unit 103 outputs the attribute data 61*a* (illustrated in FIG. 4) of the sheet S which is included in the decoded recognition code 61 to the accessory information acquiring unit 104.

In Act 104, the accessory information acquiring unit 104 acquires the accessory information related to the security of the sheet S from the attribute data 61*a* output by the decoding unit 103. Further, the accessory information acquiring unit 104 acquires the accessory information for using the functions provided by the MFP 30, from the attribute data 61*a*. The accessory information acquiring unit 104 outputs the acquired accessory information to the execution availability determining unit 105.

In Act 105, the execution availability determining unit 105 each determines the execution availability of the erase processing function for the sheet, the execution necessity of the encryption processing function, and the execution availability of the preservation processing function for the scan image data, based on the accessory information related to the security which is acquired by the accessory information acquiring unit 104. Specifically, the execution availability determining unit 105 determines whether the execution availability of the erase processing function, the execution availability of the preservation processing function, and the execution necessity of the encryption processing function are the same as the following condition (a). The following condition (a) is a case where the sheet S is a sheet having the low security level. Accordingly, in other words, the execution availability determining unit 105 determines whether the sheet S is the sheet having the low security level.

(a) The erase processing function and the preservation processing function are executable, and the encryption processing function is not executable (execution is unnecessary).

When the determination results of the execution availability determining unit 105 do not satisfy the above condition (a) (Yes in Act 105), the process of the image erasing apparatus 10 proceeds to Act 106.

On the other hand, in Act 105, when the determination results of the execution availability determining unit 105 satisfy the above condition (a) (No in Act 105), the execution availability determining unit 105 outputs the determination results of the above condition (a) to the execution control unit 106. The execution control unit 106 outputs the information on the erase permission control for permitting the execution of the erase processing function to the erase processing unit 109, based on the determination results of the above condition (a) determined by the execution availability determining unit 105. The execution control unit 106 outputs the information on the preservation permission control for permitting the execution of the preservation processing function for the scan image to the scan processing unit 107, based on the determination results of the above condition (a) determined by the execution availability determining unit 105. Further, the execution control unit 106 outputs the information on the encryption prohibition control for prohibiting the execution of the encryption processing function to the scan processing unit 107, based on the results of the above condition (a) determined by the execution availability determining unit 105. After the execution control unit 106 outputs the respective control information, the process of the image erasing apparatus 10 proceeds to Act 114.

In Act 106, further, the execution availability determining unit 105 each determines the execution availability of the erase processing function for the sheet, the execution necessity of the encryption processing function, and the execution availability of the preservation processing function for the scan image data, based on the accessory information related to the security which is acquired by the accessory information acquiring unit 104. Specifically, the execution availability determining unit 105 determines whether or not to be the same as the following condition (b) or (c).

(b) The erase processing function and the preservation processing function are not executable.

(c) The erase processing function and preservation processing function are executable, and the encryption processing function is executable (execution is necessary).

When the determination results of the execution availability determining unit 105 satisfy the condition below (b) (No in Act 106), the execution availability determining unit 105 outputs the determination results of the above condition (b) to the execution control unit 106. The execution control unit 106 outputs the information on the erase-prohibition control for prohibiting the execution of the erase processing function to the erase processing unit 109, based on the determination results of the above condition (b). Further, the execution control unit 106 outputs the information on the preservation prohibition control for prohibiting the execution of the preservation processing function for the scan image to the scan processing unit 107, based on the determination results of the above condition (b). After the execution control unit 106 outputs the respective control information, the process of the image erasing apparatus 10 proceeds to Act 108. In Act 108, the scan processing unit 107 prohibits preservation of the scan image data based on the information on the preservation prohibition control output from the execution control unit 106. Specifically, the scan processing unit 107 erases the scan image data without sending it to the scan image storing unit 108 and the MFP 30. Further, the erase processing unit 109 prohibits the erase processing of the erase unit 20 based on the information on the erase-prohibition control output from the execution control unit 106. In Act 108, further, the control panel 56 displays, for example, alert information as follows:

"A set document is a document of a security level which cannot be decolored. Please confirm it." After the control panel 56 displays the alert information, the process of the image erasing apparatus 10 is completed.

On the other hand, in Act 106, the determination results of the execution availability determining unit 105 satisfy the above condition (c) (Yes in Act 106), the execution availability determining unit outputs the determination results of the above condition (c) to the execution control unit 106.

The execution control unit 106 outputs the information on the erase permission control for permitting the execution of the erase processing function to the erase processing unit 109, based on the determination results of the above condition (c) determined by the execution availability determining unit 105. Further, the execution control unit 106 outputs the information on the preservation permission control for permitting the execution of the preservation processing function for the scan image to the scan processing unit 107, based on the results of the above condition (c) determined by the execution availability determining unit 105. Further, the execution control unit 106 outputs the information on the encryption permission control for permitting the execution of the encryption processing function for the scan image data to the scan processing unit 107, based on the results of the above condition (c) determined by the execution availability determining unit 105.

Further, the execution availability determining unit 105 determines the availability of the functions of the MFP 30, for example, the availability of the filing BOX function, based on the accessory information related to the use of the functions of the MFP 30 which is acquired by the accessory information acquiring unit 104. The execution availability determining unit 105 outputs the determination results regarding the availability of the filing BOX function to the execution control unit 106. The execution control unit 106 outputs the control information based on the determination results regarding the availability of the filing BOX function from the execution availability determining unit 105. After the execution control unit 106 outputs the respective control information, the process of the image erasing apparatus 10 proceeds to Act 107.

In Act 107, the scan processing unit 107 temporarily stores the scan image data in the buffer (not illustrated) in the image erasing apparatus 10 before the scan image data is sent to the scan image storing unit 108 or the MFP 30, based on the information on the preservation permission control output from the execution control unit 106. When the scan processing unit 107 temporarily stores the scan image data, the process of the image erasing apparatus 10 proceeds to Act 109.

In Act 109, the scan processing unit 107 confirms that the execution of the encryption processing function for the scanner image data is necessary, based on the information on the encryption permission control output from the execution control unit 106. When the scan processing unit 107 confirms that the execution of the encryption processing function for the scanner image data is necessary, the process of the image erasing apparatus 10 proceeds to Act 110. In Act 110, the scan processing unit 107 reads out the scan image data from the buffer in the image erasing apparatus 10. The scan processing unit 107 executes the encryption processing of the scan image data read out from the buffer. The scan processing unit 107 stores the encrypted scan image data in the buffer to update contents stored in the buffer. When the scan processing unit 107 updates the contents stored in the buffer, the process of the image erasing apparatus 10 proceeds to Act 111.

In Act 111, the scan processing unit 107 determines whether the preservation destination of the encrypted scan image data is within the image erasing apparatus 10 or the MFP 30, based on the control information regarding the use of the filing BOX output from the execution control unit 106. Specifically, the scan processing unit 107 determines whether the use of the filing BOX function is permitted, based on the control information output from the execution control unit 106. The process of the image erasing apparatus 10 proceeds to Act 112 when the scan processing unit 107 determines that the use of the filing BOX function is prohibited (Yes in Act 111), based on the information on the filing BOX utilization prohibition control output from the execution control unit 106. In other words, when the scan processing unit 107 determines that the preservation destination of the encrypted scan image data is within the image erasing apparatus 10, the process of the image erasing apparatus 10 proceeds to Act 112. In Act 112, the scan processing unit 107 sends the encrypted scan image data to the scan image storing unit 108. The scan image storing unit 108 preserves the encrypted scan image data. If the scan image storing unit 108 preserves the image data, the process of the image erasing apparatus 10 proceeds to Act 116. On the other hand, in Act 111, when the scan processing unit 107 determines that the use of the filing BOX function is permitted (No in Act 111), based on the information on the preservation permission control output from the execution control unit 106, the process of the image erasing apparatus 10 proceeds to Act 113. In other words, when the scan processing unit 107 determines that the preservation destination of the scan image data is the folder of the MFP 30, the process of the image erasing apparatus 10 proceeds to Act 113. In Act 113, the scan processing unit 107 sends the encrypted scan image data to the MFP 30 through the communication device 54. The MFP 30 preserves the encrypted scan image data in the folder of the MFP 30 by the filing BOX function. In other words, the scan processing unit 107 preserves the encrypted scan image data using the filing BOX function of the MFP 30. When the scan processing unit 107 sends the encrypted scan image data to the MFP 30, the process of the image erasing apparatus 10 proceeds to Act 116.

Meanwhile, in Act 114, the scan processing unit 107 confirms that the preservation of the scan image data is permitted, based on the information on the preservation permission control output from the execution control unit 106. Further, the scan processing unit 107 confirms that the encryption processing for the scan image data is unnecessary, based on the information on the encryption prohibition control output from the execution control unit 106. The scan processing unit 107 sends the scan image data to the scan image storing unit 108. When the scan processing unit 107 sends the scan image data to the scan image storing unit 108, the process of the image erasing apparatus 10 proceeds to Act 115.

In Act 115, the scan image storing unit 108 preserves the image data. When the scan image storing unit 108 preserves the scan image data, the process of the image erasing apparatus 10 proceeds to Act 116.

In Act 116, the erase processing unit 109 drives the erase unit 20 based on the information on the erase permission control output from the execution control unit 106. The erase unit 20 decolors the image formed on the sheet S. The erase unit 20 performs the erase processing of the image by decoloring the image formed on the sheet S. When the erase unit 20 performs the erase processing, the process of the image erasing apparatus 10 is completed. In the above description, the image erasing apparatus 10 operates in such a manner that the sheet S to be erased is fed by the sheet feeding unit 12 and then the sheet passes through the scanner 13 only once before the erase processing. In other words, the recognition code is detected using the scan image data generated by the scanner 13 in Act 101, and the scan image data generated by the scanner 13 in Act 101 is preserved by the processes from Act 107 to Act 113 or the processes from Act 104 to Act 115. However, the first embodiment is not limited to such an operation. For example, the image erasing apparatus 10 may operate in such a manner that after the sheet S to be erased is fed by the sheet feeding unit 12 and the sheet S passes through the scanner 13 two times before the erase processing. In this case, when the sheet S initially passes through the scanner 13 in Act 101, the readout processing unit 101 drives the scanner 13. The scanner 13 scans the sheet S and generates the scan image data. The scan image data is used to detect the recognition code in Act 102. Accordingly, in Act 101, the scanner 13 is not necessary to generate the scan image data with high accuracy. The accuracy in generating the scan image data has only to correspond to accuracy in detecting the recognition code. After initially passing through the scanner 13, the sheet S is conveyed by the second conveyance path 142 and the third conveyance path 143 and then returns to the first conveyance path 141. While the sheet S is conveyed by the second conveyance path 142 and the third conveyance path 143, the operation of the erase unit 20 is prohibited. When the sheet S returns to the first conveyance path 141 and secondly passes through the scanner 13, the scan processing unit 107 drives again the scanner 13 in Act 107 or Act 114. In Act 107 or Act 114, the scanner 13 scans again the sheet S and generates the scan image data for preserving.

As described above, according to the image erasing apparatus 10 of the first embodiment, before the execution of the erase processing, the execution availability of the erase processing function is determined based on the recognition code such as the two-dimensional bar code included in the sheet S to be erased. Therefore, even when the sheet having the high security level (for example, an important document or a confidential document) is set in the sheet feeding tray 12 by the user as the sheet S to be erased, it is possible to prevent erroneous erase processing of the important document or the confidential document. Further, according to the image erasing apparatus 10 of the first embodiment, when the sheet S to be erased is the sheet having the high security level (for example, the important document or the confidential document), there is also restricted (prohibited) the preservation of scan image data in the image erasing apparatus 10 or the storage area (folder) of a host computer (MFP 30) connected through the network. Accordingly, information leakage caused by hardware analysis of the apparatus is prevented, and the image erasing apparatus 10 can contribute to prevent the erase processing and to also improve the security level of the information.

Figure 6:
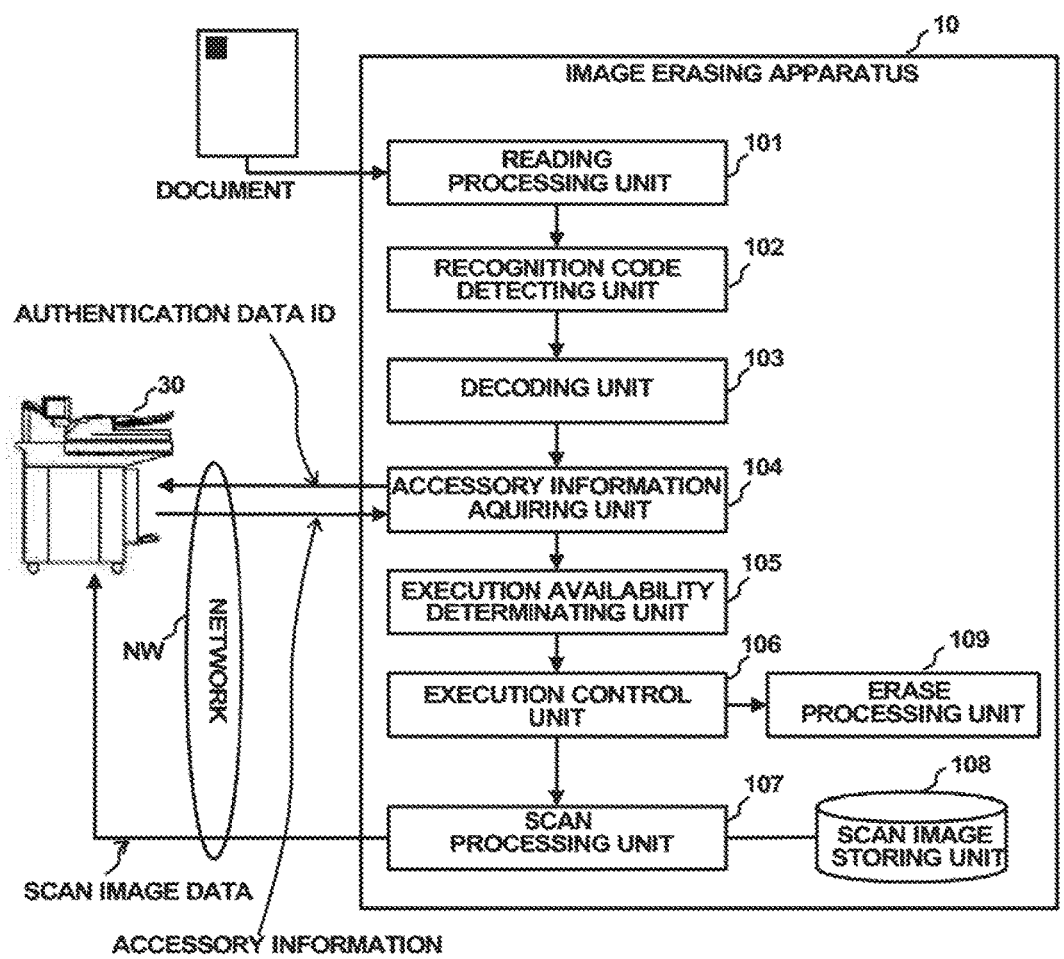
FIG. 6 is a block diagram illustrating a control configuration of an image erasing apparatus according to a second embodiment.

An image erasing apparatus 10 according to a second embodiment will be described below with reference to FIG. 6. FIG. 6 is a block diagram illustrating a control function of the image erasing apparatus 10 according to the second embodiment. In FIG. 6, since the same reference numerals as in the first embodiment indicate the same components, the description thereof is not present, and parts different from the first embodiment will be described in detail.

As illustrated in FIG. 6, according to the image erasing apparatus 10 of the second embodiment, an acquisition destination of accessory information in an accessory information acquiring unit 104 differs from the first embodiment. Specifically, according to the first embodiment, the recognition code (attribute data) is configured to hold the accessory information in advance as described above. In contrast, according to the second embodiment, the recognition code does not hold the accessory information. The recognition code may be configured to hold at least authentication data ID as attribute data. A decoding unit 103 outputs the authentication data ID held in the recognition code as the attribute data. When the decoding unit 103 outputs the authentication data ID, an accessory information acquiring unit 104 acquires accessory information previously associated with the authentication data ID from an MFP 30 which is an apparatus (host computer) of a connection destination, using the authentication data ID as a key. In other words, the accessory information is preserved in the MFP 30. The authentication data ID is data acting as a key for acquiring the accessory information preserved in the MFP 30. The attribute data holds the authentication data ID as the key corresponding to the accessory information preserved in the MFP 30.

Figure 7:
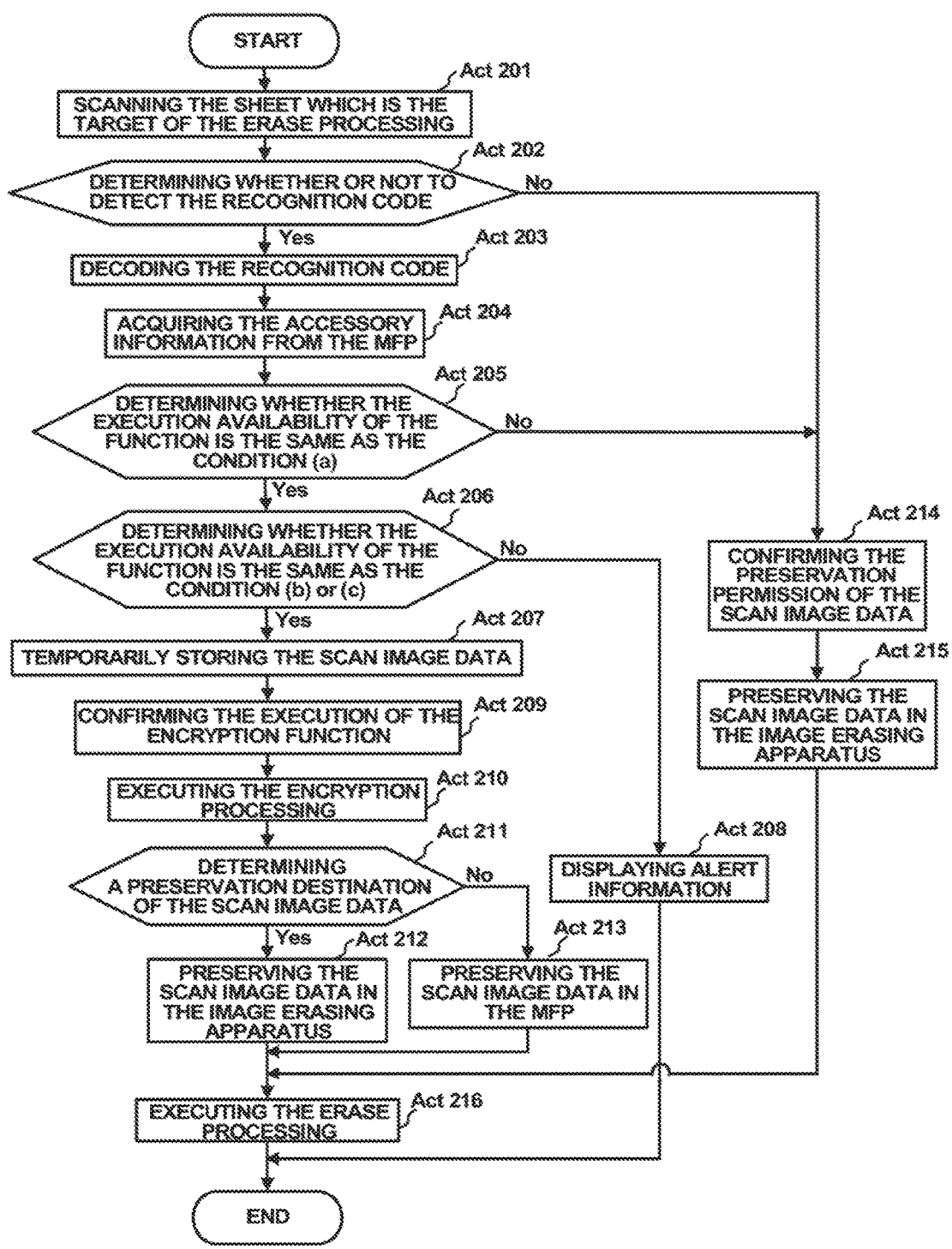
FIG. 7 is a flowchart illustrating control processing of the image erasing apparatus according to the second embodiment.

Security control processing of the image erasing apparatus 10 having the same configuration as described above will be described below with reference to FIG. 7. FIG. 7 is a flowchart illustrating the control processing of the image erasing apparatus 10 according to the second embodiment. It is assumed that the sheet S having a high security level and the sheet S having a low security level are mixedly set in a sheet feeding unit 12 of the image erasing apparatus 10. As in the first embodiment, the image erasing apparatus 10 supplies the sheet S, which is the target of erase processing, to a first conveyance path 141 from the sheet feeding unit 12 when a control panel 11 receives a request of the erase processing input by the user. The image erasing apparatus 10 starts to operate by sending the sheet S to the first conveyance path 141. The image erasing apparatus 10 performs the erase processing according to the following security control processing.

When the image erasing apparatus 10 starts to operate, the sheet S is conveyed to a scanner 13 through the first conveyance path 141. As illustrated in FIG. 7, in Act 201, a readout processing unit 101 controls a scanning operation using the scanner 13. The scanner 13 scans the sheet S which is the target of the erase processing and generates scan image data based on scanning results.

In Act 202, a recognition code detecting unit 102 determines whether or not to detect the recognition code by searching the surface of the sheet S which is the target of the erase processing. Specifically, the recognition code detecting unit 102 compares the previously stored standard information of the recognition code with the image data generated by the readout unit 101. The recognition code detecting unit 102 detects the recognition code included in the sheet S from comparison results. When the recognition code detecting unit 102 detects the recognition code (Yes in Act 202), the recognition code detecting unit 102 outputs the detected recognition code to a decoding unit 103. If the recognition code detecting unit 102 outputs the recognition code to the decoding unit 103, the process of the image erasing apparatus 10 proceeds to Act 203. The image erasing apparatus 10 considers the sheet S as a sheet having the high security level and performs processes subsequent to Act 203. In contrast, when the recognition code detecting unit 102 does not detect the recognition code (No in Act 202), the process of the image erasing apparatus 10 proceeds to Act 214. The image erasing apparatus 10 considers the sheet S as a sheet having the low security level and performs processes subsequent to Act 214.

In Act 203, the decoding unit 103 decodes the recognition code detected by the recognition code detecting unit 102. The decoding unit 103 outputs the authentication data ID to an accessory information acquiring unit 104, as attribute data of the sheet S which is included in the decoded recognition code.

In Act 204, the accessory information acquiring unit 104 acquires the accessory information related to the security of the sheet from the MFP 30 of the connection destination, using the authentication data ID output by the decoding unit 103 as the key. Further, the accessory information acquiring unit 104 acquires the accessory information for using the functions provided by the MFP 30 using the authentication data ID as the key, from the MFP 30 of the connection destination. The accessory information acquiring unit 104 outputs the acquired accessory information to an execution availability determining unit 105. In the flowchart illustrated in FIG. 7, whenever the readout unit 101 performs the scanning of the sheet S using the scanner 13, the accessory information acquiring unit 104 accesses the MFP 30 using the authentication data ID as the key. In contrast, the image erasing apparatus 10 may download a corresponding list between the authentication data ID and the accessory information in advance from the MFP 30 in consideration of an update frequency of information in the MFP 30. For example, if the corresponding list is previously downloaded at timing where power of the image erasing apparatus 10 is turned ON or at a period of several hours, it is possible to suppress the number of accesses to the MFP 30 by the accessory information acquiring unit 104.

In Act 205, the execution availability determining unit 105 each determines execution availability of an erase processing function for the sheet, execution necessity of an encryption processing function, and execution availability of a preservation processing function for the scan image data, based on the accessory information related to the security which is acquired by the accessory information acquiring unit 104. Specifically, the execution availability determining unit 105 determines whether the execution availability of the erase processing function, the execution availability of the preservation processing function, and the execution necessity of the encryption processing function are the same as the following condition (a). The following condition (a) is a case where the sheet S is a sheet having a low security level. Accordingly, in other words, the execution availability determining unit 105 determines whether the sheet S is the sheet having the low security level.

(a) The erase processing function and the preservation processing function are executable, and the encryption processing function is not executable (execution is unnecessary).

When the determination results of the execution availability determining unit 105 do not satisfy the above condition (a) (Yes in Act 205), the process of the image erasing apparatus 10 proceeds to Act 206.

On the other hand, in Act 205, when the determination results of the execution availability determining unit 105 satisfy the above condition (a) (No in Act 205), the execution availability determining unit 105 outputs the determination results of the above condition (a) to an execution control unit 106. The execution control unit 106 outputs information on erase permission control for permitting the execution of the erase processing function to an erase processing unit 109, based on the results of the above condition (a) determined by the execution availability determining unit 105. The execution control unit 106 outputs information on preservation permission control for permitting the execution of the preservation processing function for the scan image to a scan processing unit 107, based on the determination results of the above condition (a) determined by the execution availability determining unit 105. Further, the execution control unit 106 outputs information on encryption prohibition control for prohibiting the execution of the encryption processing function to the scan processing unit 107, based on the determination results of the above condition (a) determined by the execution availability determining unit 105. After the execution control unit 106 outputs the respective control information, the process of the image erasing apparatus 10 proceeds to Act 214.

In Act 206, further, the execution availability determining unit 105 each determines the execution availability of the erase processing function for the sheet, the execution necessity of the encryption processing function, and the execution availability of the preservation processing function for the scan image data, based on the accessory information related to the security which is acquired by the accessory information acquiring unit 104. Specifically, the execution availability determining unit 105 determines whether or not to be the same as the following condition (b) or (c).

(b) The erase processing function and the preservation processing function are not executable.

(c) The erase processing function and preservation processing function are executable, and the encryption processing function is executable (execution is necessary).

When the determination results of the execution availability determining unit 105 satisfy the above condition (b) (No in Act 206), the execution availability determining unit 105 outputs the determination results of the above condition (b) to the execution control unit 106. The execution control unit 106 outputs the information on the erase-prohibition control for prohibiting the execution of the erase processing function to the erase processing unit 109, based on the determination results of the above condition (b). Further, the execution control unit 106 outputs the information on the preservation prohibition control for prohibiting the execution of the preservation processing function for the scan image to the scan processing unit 107, based on the determination results of the above condition (b). After the execution control unit 106 outputs the respective control information, the process of the image erasing apparatus 10 proceeds to Act 208. In Act 208, the scan processing unit 107 prohibits preservation of the scan image data based on the information on the preservation prohibition control output from the execution control unit 106. Specifically, the scan processing unit 107 erases the scan image data without sending it to the scan image storing unit 108 and the MFP 30. Further, the erase processing unit 109 prohibits the erase processing of the erase unit 20 based on the information on the erase-prohibition control output from the execution control unit 106. In Act 208, further, a control panel 56 displays, for example, alert information as follows:

"A set document is a document of a security level which cannot be decolored. Please confirm it." After the control panel 56 displays the alert information, the process of the image erasing apparatus 10 is completed.

On the other hand, in Act 206, the determination results of the execution availability determining unit 105 satisfy the above condition (c) (Yes in Act 206), the determination results of the above condition (c) is output to the execution control unit 106.

The execution control unit 106 outputs the information on the erase permission control for permitting the execution of the erase processing function to the erase processing unit 109, based on the results of the above condition (c) determined by the execution availability determining unit 105. Further, the execution control unit 106 outputs the information on the preservation permission control for permitting the execution of the preservation processing function for the scan image to the scan processing unit 107, based on the determination results of the above condition (c) determined by the execution availability determining unit 105. Further, the execution control unit 106 outputs the information on the encryption permission control for permitting the execution of the encryption processing function for the scan image data to the scan processing unit 107, based on the determination results of the above condition (c) determined by the execution availability determining unit 105. Further, the execution availability determining unit 105 determines the availability of the functions of the MFP 30, for example, the availability of the filing BOX function, based on the accessory information related to the use of the functions of the MFP 30 which is acquired by the accessory information acquiring unit 104. The execution availability determining unit 105 outputs the determination results regarding the availability of the filing BOX function to the execution control unit 106. The execution control unit 106 outputs the control information based on the determination results regarding the availability of the filing BOX function from the execution availability determining unit 105. After the execution control unit 106 outputs the respective control information, the process of the image erasing apparatus 10 proceeds to Act 207.

In Act 207, the scan processing unit 107 temporarily stores the scan image data in the buffer (not illustrated) in the image erasing apparatus 10 before the scan image data is sent to the scan image storing unit 108 or the MFP 30, based on the information on the preservation permission control output from the execution control unit 106. When the scan processing unit 107 temporarily stores the scan image data, the process of the image erasing apparatus 10 proceeds to Act 209.

In Act 209, the scan processing unit 107 confirms that the execution of the encryption processing function for the scanner image data is necessary, based on the information on the encryption permission control output from the execution control unit 106. When the scan processing unit 107 confirms that the execution of the encryption processing function for the scanner image data is necessary, the process of the image erasing apparatus 10 proceeds to Act 210. In Act 210, the scan processing unit 107 reads out the scan image data from the buffer in the image erasing apparatus 10. The scan processing unit 107 executes the encryption processing of the scan image data read out from the buffer. The scan processing unit 107 stores the encrypted scan image data in the buffer to update contents stored in the buffer. When the scan processing unit 107 updates the contents stored in the buffer, the process of the image erasing apparatus 10 proceeds to Act 211.

In Act 211, the scan processing unit 107 determines whether a preservation destination of the encrypted scan image data is within the image erasing apparatus 10 or the MFP 30, based on the control information regarding the use of the filing BOX output from the execution control unit 106. Specifically, the scan processing unit 107 determines whether the use of the filing BOX function is permitted, based on the control information output from the execution control unit 106. The process of the image erasing apparatus 10 proceeds to Act 212 when the scan processing unit 107 determines that the use of the filing BOX function is prohibited (Yes in Act 211), based on the information on the filing BOX utilization prohibition control output from the execution control unit 106. In other words, when the scan processing unit 107 determines that the preservation destination of the encrypted scan image data is inside the image erasing apparatus 10, the process of the image erasing apparatus 10 proceeds to Act 212. In Act 212, the scan processing unit 107 sends the encrypted scan image data to the scan image storing unit 108. The scan image storing unit 108 preserves the encrypted scan image data. If the scan image storing unit 108 preserves the image data, the process of the image erasing apparatus 10 proceeds to Act 216. On the other hand, in Act 211, when the scan processing unit 107 determines that the use of the filing BOX function is permitted (No in Act 211), based on the information on the preservation permission control output from the execution control unit 106, the process of the image erasing apparatus 10 proceeds to Act 213. In other words, when the scan processing unit 107 determines that the preservation destination of the scan image data is the folder of the MFP 30, the process of the image erasing apparatus 10 proceeds to Act 213. In Act 213, the scan processing unit 107 sends the encrypted scan image data to the MFP 30 through a communication device 54. The MFP 30 preserves the encrypted scan image data in the folder of the MFP 30 by the filing BOX function. In other words, the scan processing unit 107 preserves the encrypted scan image data using the filing BOX function of the MFP 30. When the scan processing unit 107 sends the encrypted scan image data to the MFP 30, the process of the image erasing apparatus 10 proceeds to Act 216.

Meanwhile, in Act 214, the scan processing unit 107 confirms based on the information on the preservation permission control output from the execution control unit 106 that the preservation of the scan image data is permitted. Further, the scan processing unit 107 confirms that the encryption processing for the scan image data is unnecessary, based on the information on the encryption prohibition control output from the execution control unit 106.

The scan processing unit 107 sends the scan image data to the scan image storing unit 108. When the scan processing unit 107 sends the scan image data to the scan image storing unit 108, the process of the image erasing apparatus 10 proceeds to Act 215.

In Act 215, the scan image storing unit 108 preserves the image data. When the scan image storing unit 108 preserves the scan image data, the process of the image erasing apparatus 10 proceeds to Act 216.

In Act 216, the erase processing unit 109 drives an erase unit 20 based on the information on the erase permission control output from the execution control unit 106. The erase unit 20 decolors the image formed on the sheet S. The erase unit 20 performs the erase processing of the image by decoloring the image formed on the sheet S, and the process of the image erasing apparatus 10 is completed when the erase unit 20 performs the erase processing. In the above description, the image erasing apparatus 10 operates in such a manner that the sheet S to be erased is fed by the sheet feeding unit 12 and then the sheet passes through the scanner 13 only once before the erase processing. In other words, the recognition code is detected using the scan image data generated by the scanner 13 in Act 201, and the scan image data generated by the scanner 13 in Act 201 is preserved by the processes from Act 207 to Act 213 or the processes from Act 204 to Act 215. However, as in the first embodiment, the second embodiment is not limited to such an operation. For example, the image erasing apparatus 10 may operate in such a manner that after the sheet S to be erased is fed by the sheet feeding unit 12 and the sheet passes through the scanner 13 twice before the erase processing. In this case, when the sheet S initially passes through the scanner 13 in Act 201, the readout processing unit 101 drives the scanner 13. The scanner 13 scans the sheet S and generates the scan image data. The scan image data is used to detect the recognition code in Act 202. Accordingly, in Act 201, the scanner 13 is not necessary to generate the scan image data with high accuracy. The accuracy in generating the scan image data has only to correspond to accuracy in detecting the recognition code. After initially passing through the scanner 13, the sheet S is conveyed by the second conveyance path 142 and the third conveyance path 143 and then returns to the first conveyance path 141. While the sheet S is conveyed by the second conveyance path 142 and the third conveyance path 143, the operation of the erase unit 20 is prohibited. When the sheet S returns to the first conveyance path 141 and secondly passes through the scanner 13, the scan processing unit 107 drives again the scanner 13 in Act 207 or Act 214. In Act 207 or Act 214, the scanner 13 scans again the sheet S and generates the scan image data for preserving.

As described above, according to the image erasing apparatus 10 of the second embodiment, the accessory information acquiring unit 104 acquires the accessory information from the MFP 30 side of the connection destination, using the authentication data ID included in the recognition code as the key. Accordingly, the image erasing apparatus 10 can perform various kinds of security control on the same sheet by arbitrarily updating the accessory information to the authentication data ID in the MFP 30. For example, even when the image formed on the sheet S has the high security level and is non-erasable at the present moment, there is a case where the security level is lowered with the lapse of time. In this manner, when the security level is lowered with the lapse of time, from the time when the security is lowered, the image erasing apparatus 10 can execute the erase processing of the image formed on the sheet by updating the accessory information to the authentication data ID. Further, as described above, the recognition code has only to hold at least the authentication data ID. Accordingly, the image erasing apparatus 10 can perform complicated security control even when the one-dimensional bar code and the like is used instead of the two-dimensional bar code, as the recognition code, the one-dimensional bar code having an amount of holdable data smaller than that of the two-dimensional bar code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image decoloring apparatus comprising:
a sheet feeding device configured to feed a sheet on which an image is formed with decolorable coloring material;
a sheet discharging tray configured to receive the sheet when discharged;
a first sheet conveyance path extending from the sheet feeding device to the sheet discharging tray;
a second sheet conveyance path branching from the first sheet conveyance path at a first position upstream of the sheet discharging tray and joining the first sheet path at a second position downstream of the sheet feeding device;
a decoloring device arranged in the second conveyance path and configured to decolor the image formed on the sheet which is fed by the sheet feeding device;
a scanner arranged between the first position and the second position in the first conveyance path and configured to generate image data by scanning the sheet before the image is decolored by the decoloring device;
a storage unit configured to store the image data; and
a processor configured to:
detect a recognition code on the sheet based on the image data generated by the scanner,
decode the recognition code and output attribute data of the sheet which is included in the recognition code,
acquire security information related to security of the sheet and corresponding to the output attribute data,
determine whether to decolor the image on the sheet and whether to store the image data as a backup copy of the image formed on the sheet before the decoloring device decolors the image, based on the acquired security information, and
based on the determination made by the processor, control the decoloring device and the storage unit to prevent the storage unit from storing the image data when the determination is made to not store the image data as the backup copy.

2. The image decoloring apparatus according to claim 1, wherein the image decoloring apparatus is connected to an image forming apparatus, and the security information is stored in the image forming apparatus.

3. The image decoloring apparatus according to claim 2, wherein the attribute data includes authentication data as a key for acquiring the corresponding security information stored in the image forming apparatus.

4. The image decoloring apparatus according to claim 3, wherein the processor acquires the security information from the image forming apparatus, using the authentication data included in the attribute data.

5. The image decoloring apparatus according to claim 1, wherein the recognition code is included in the image formed with decolorable coloring material on the sheet.

6. The image decoloring apparatus according to claim 5, wherein the recognition code is any one of a one-dimensional bar code, a two-dimensional bar code, a predetermined symbol, and a predetermined image.

7. The image decoloring apparatus according to claim 6, wherein the image decoloring apparatus is connected to an image forming apparatus, the processor is further configured to acquire accessory information corresponding to the attribute data, the accessory information including permission for using one or more functions of the image forming apparatus.

8. The image decoloring apparatus according to claim 7, wherein the processor determines availability of the functions of the image forming apparatus with respect to the sheet and the image data, based on the accessory information.

9. The image decoloring apparatus according to claim 8, wherein the processor controls the image forming apparatus to store the image data generated by the scanner when the processor determines that a storing function of the image forming apparatus is available.

10. The image decoloring apparatus according to claim 7, wherein the security information is included in the accessory information.

11. The image decoloring apparatus according to claim 1, wherein when the processor determines that the sheet includes confidential information based on the acquired security information, the processor controls the decoloring device to not decolor the image formed on the sheet.

12. The image decoloring apparatus according to claim 1, wherein when the processor determines that the sheet does not include confidential information based on the acquired security information, the processor controls the decoloring device to decolor the image formed on the sheet.

13. The image decoloring apparatus according to claim 1, wherein when the processor determines that the sheet includes confidential information based on the acquired security information, the processor controls the storage unit to delete the image data and to prevent the storage unit from storing the image data.

14. The image decoloring apparatus according to claim 1, wherein when the processor determines that the sheet includes confidential information based on the acquired security information, the processor controls the storage unit to store the image data in an encrypted format.

15. The image decoloring apparatus according to claim 1, wherein when the processor determines that the sheet does not include confidential information based on the acquired security information, the processor controls the storage unit to store the image data.

* * * * *